US008244842B1

(12) United States Patent
Simons et al.

(10) Patent No.: US 8,244,842 B1
(45) Date of Patent: Aug. 14, 2012

(54) COMPUTER MANAGEMENT

(75) Inventors: David Alan Simons, Welwyn Garden City (GB); Robert Leslie Tuck, Wokingham (GB); Ashley Kevin Baumann, Wokingham (GB)

(73) Assignee: Oracle America, Inc., Redwood City, CA (US)

( * ) Notice: Subject to any disclaimer, the term of this patent is extended or adjusted under 35 U.S.C. 154(b) by 2821 days.

(21) Appl. No.: 10/867,423

(22) Filed: Jun. 14, 2004

(51) Int. Cl.
*G06F 15/173* (2006.01)
(52) U.S. Cl. .................. 709/223; 709/217; 709/220
(58) Field of Classification Search .................. 709/223, 709/217, 220
See application file for complete search history.

(56) References Cited

U.S. PATENT DOCUMENTS

| | | | |
|---|---|---|---|
| 6,018,743 A * | 1/2000 | Xu ........................................ | 1/1 |
| 6,141,759 A * | 10/2000 | Braddy ............................ | 726/14 |
| 6,226,679 B1 * | 5/2001 | Gupta ............................ | 709/230 |
| 6,233,610 B1 * | 5/2001 | Hayball et al. ................. | 709/223 |
| 6,260,062 B1 * | 7/2001 | Davis et al. .................... | 709/223 |
| 6,609,158 B1 * | 8/2003 | Nevarez et al. ................ | 719/316 |
| 7,149,740 B2 * | 12/2006 | Dhanda ................................ | 1/1 |
| 2002/0073236 A1 * | 6/2002 | Helgeson et al. ............. | 709/246 |
| 2003/0028895 A1 * | 2/2003 | Buehler et al. ................ | 725/119 |
| 2003/0145074 A1 * | 7/2003 | Penick ........................... | 709/223 |
| 2004/0221202 A1 * | 11/2004 | Nye et al. ......................... | 714/38 |
| 2005/0060397 A1 * | 3/2005 | Barthram et al. ............. | 709/223 |

* cited by examiner

*Primary Examiner* — David Lazaro
*Assistant Examiner* — Waseem Ashraf
(74) *Attorney, Agent, or Firm* — Meyertons, Hood, Kivlin, Kowert & Goetzel, P.C.

(57) ABSTRACT

A management adapter is provided for a computer management system. A data acquisition layer provides a mapping between platform-specific instrumentation interface and platform-specific component tables. A management model transformation layer provides a mapping between the platform-specific component tables and generic component tables. A presentation mapping layer provides a mapping between the generic component tables and a management protocol schema.

27 Claims, 10 Drawing Sheets

COMPUTER MANAGEMENT

RELATED APPLICATIONS

The invention is related to U.S. application Ser. No. 10/733,795, filed 11 Dec. 2004 and assigned to the assignee of the present application, the whole content of which is incorporated herein by reference.

BACKGROUND OF THE INVENTION

The invention relates to management of computer systems.

A collection of resources or components within a system can typically be represented as a hierarchy of objects. Such a representation can be helpful for management, for example for remote management of part or all of the system.

In a complex computer system, that may involve parts of the system being implemented on different platforms, providing efficient interfaces for the management of a potentially large amount of management information becomes difficult, especially in that the management information can relate potentially to a set of different platforms.

Administrators need a standard, common representation of the systems that they are managing in their environment. Such a representation may be made through a Management Information Base (MIB) or other formal management schema. This enables administrators to customize their management applications once and have that same customization work across a variety of systems and components. To provide such commonality the same management model should be used across the platforms/components and ensure the population of that model is consistent and uniform regardless of the entity responsible for that population.

However, systems and components vary with respect to the availability of the management information that is required for such a model. There are two dimensions to these variations. Firstly, the mechanism by which data is made available by the component can vary. For example, there may be different APIs and/or protocols. Secondly, the data used to represent a particular (sub)entity may vary. The variation may be a subtle naming difference, a different use of units, or a very different representation. As a result of these variations, management agents responsible for providing the data to the administrator have to be developed on a platform by platform basis. This can lead to further inconsistencies with the presentation of data and the application of management policies.

Accordingly, the invention relates to improving access to system management information in a computer system.

SUMMARY OF THE INVENTION

An aspect of the invention provides a management adapter for a computer management system. One or more data acquisition modules can provide a mapping between one or more platform-specific instrumentation interfaces for a computer system platform and one or more platform-specific component tables providing a platform-specific representation of platform components. One or more management model transformation modules can provide a mapping between the platform-specific component table(s) and one or more generic component tables providing platform-independent representations of the platform components. One or more presentation mapping modules can provide a mapping between the at least one generic component table and a management protocol schema.

An embodiment of the invention enables administrators to be provided with a standardized representation of a management environment across a range of systems or other components using a single agent technology. This facilitates management of those components. By providing different layers of abstraction, an embodiment of the invention provides a flexible and scalable management tool for managing networked computer systems.

A management agent can comprise the management adapter in combination with a protocol engine. The management adapter or management agent can be supported, for example, on a service controller of a computer system, for example a computer server system. Alternatively, the management agent functionality can be distributed on different components of a networked system. Another aspect of the invention provides a method of managing a computer management system.

Aspects of the invention can be implemented by a computer program product. A computer program product for implementing the invention can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

BRIEF DESCRIPTION OF THE DRAWINGS

Embodiments of the present invention will be described hereinafter, by way of example only, with reference to the accompanying drawings in which like reference signs relate to like elements and in which.

Figure 1:
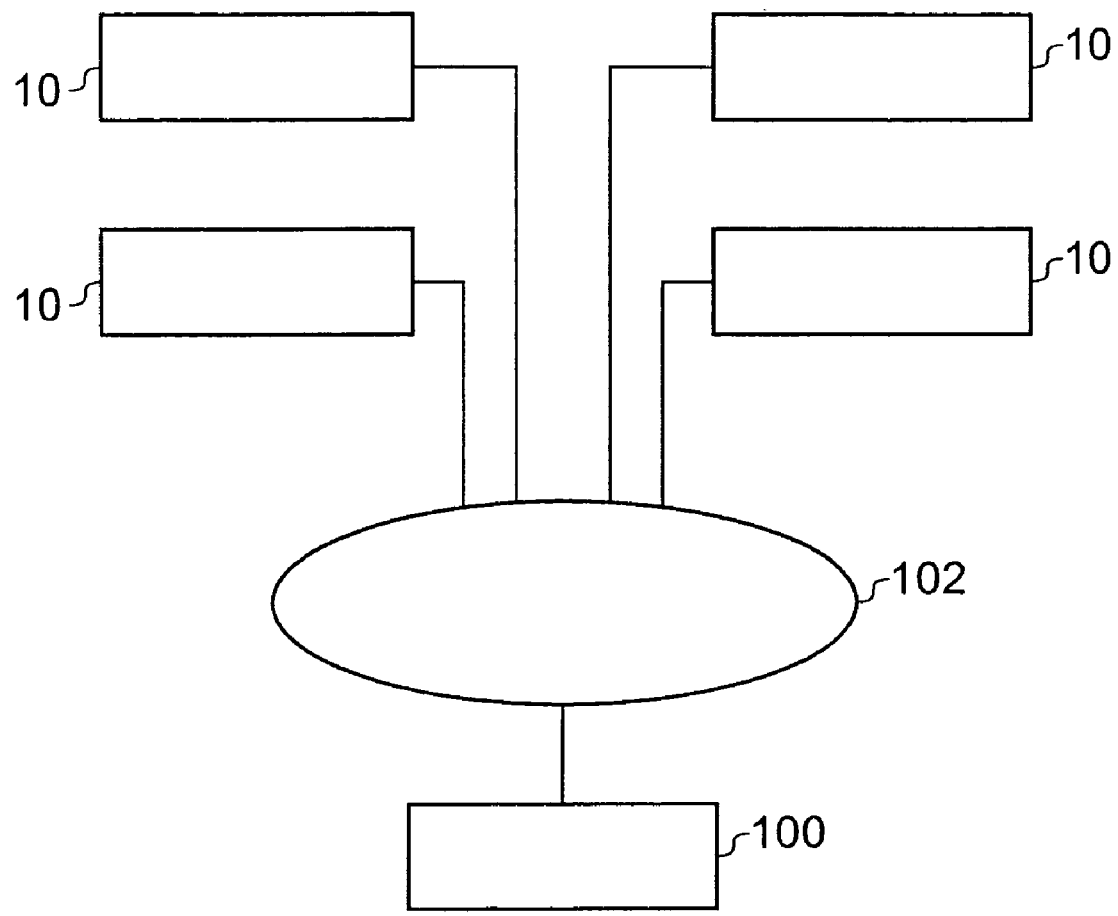
FIG. 1 is a schematic representation of managed network of computers.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

In the following, example embodiments of the present invention are described.

FIG. 1 is a schematic representation of a plurality of computers 10, for example configured as computer servers that are managed remotely, for example from a management console on a management server 100. As illustrated in FIG. 1, the computer servers are provided with a management connection to the management server 100 via a network 102, for example the Internet. It will be appreciated, however, that the computer systems 10 could instead be interconnected with the management server 100 via an intranet, or by point to point connections, or via a concentrator or intermediary computer, or in any other manner.

Figure 2:
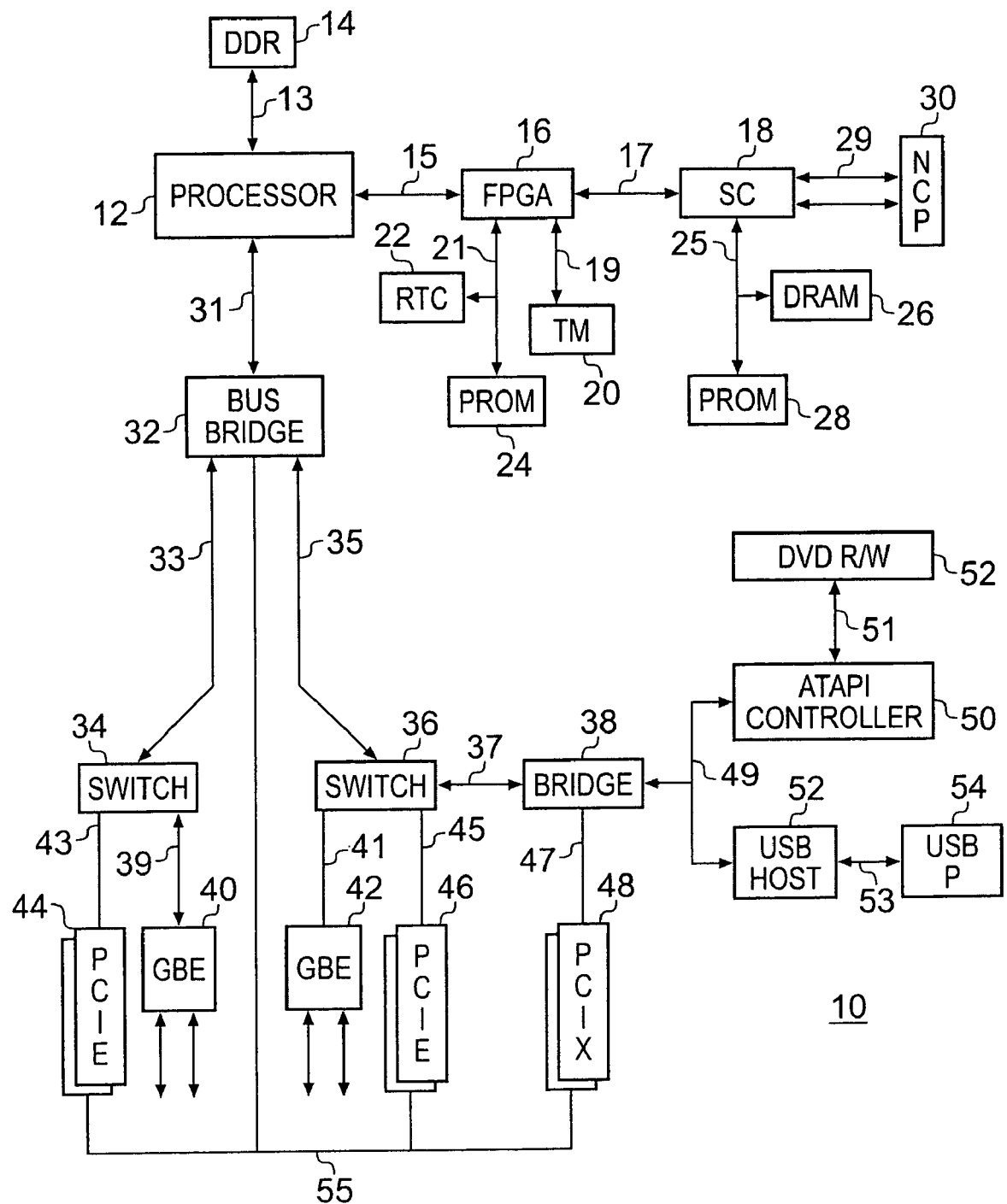
FIG. 2 is a schematic block diagram of an example of an embodiment of a computer system in accordance with the present invention.

FIG. 2 is a schematic block diagram of an example of a computer system 10, by way of example only.

As illustrated in FIG. 2, the computer system 10 includes a processor 12, which is connected via one or more memory buses 13 to memory 14, in the present instance DDR memory. The processor 12 is also connected via a bus to a field programmable data array (FPGA) 16, which provides various control operations in association with the processor 12. The FPGA 16 has access to a real-time clock 22 and a programmable read only memory 24 via a bus 21. The FPGA also has access to a trust module 20 via a bus 19.

The trust module 20 can be configured as a trusted platform module (TPM), as defined by the trusted computing group (TCG), which forms a "root of trust" for the computer system and provides encrypted hash measurements and connection authentication data to validate that software used on the systems and connections made with the system are trustworthy.

The FPGA is connected to a system controller 18 via a further bus 17. The system controller 18 has responsibilities for monitoring the operation of the processor, and for providing various control functions. The system controller has access to a programmable read only memory 28 and random access memory (e.g. dynamic random access memory (DRAM)) 26 via a bus 25. The system controller 18 also has access to network and console ports 30 via further buses 29. As will be described in more detail in the following, the service controller supports management functions, whereby remote management of the computer system 10 can be provided.

The processor 12 is connected via an I/O bus 31 to a bus bridge 32. The bus bridge 32 is connected to various buses, in the present instance buses 33 and 35, which can be configured as peripheral computer interface (PCI) buses 33 and a further bus 55, configured for example as an I2C bus.

The bus 33 is connected to a switch 34, which in turn is connected to one or more PCI buses 43. PCI cards (in the present instance PCI-E cards 44) can be connected to the PCI bus(es) 43. The switch 34 is also connected to a further bus 39, to which a network interface 40 (in the present instance a dual Gigabyte Ethernet interface) is connected. Similarly, the bus 35 is connected to a switch 36. The switch 36 is connected to a PCI bus 45, to which one or more PCI cards 46 (in the present instance PCI-E cards) are connected. The switch 36 is also connected to a further bus 41 to which a network interface 42 (in the present case a dual Gigabyte Ethernet interface) is connected.

A further bus 37 connects the switch 36 to a PCI-X bridge 38. Connected to the bridge 38 is a PCI-X bus 47 to which one or more PCI-X cards 48 can be connected. The bridge 38 is further connected to a bus 49 to which a storage controller 50 is connected for supporting a connection 51 to, for example, a DVD read/writer 52. Also connected to the bus 50 is a USB host 52, to which one or more USB ports 54 are connected via a connection 53. The bus 55 can be connected to each of the PCI cards 44, 46 and 48.

Figure 3:
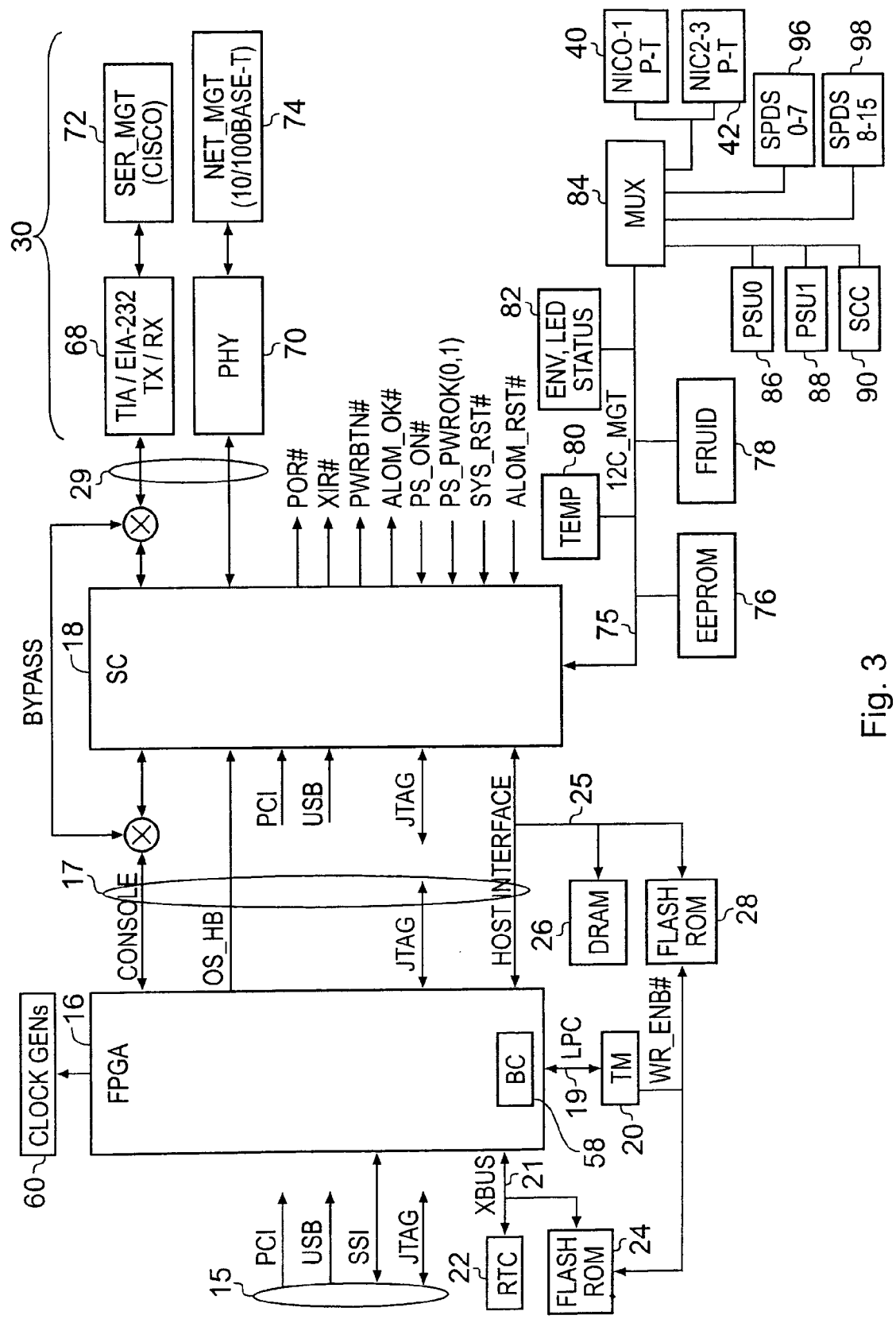
FIG. 3 is a schematic block diagram, showing in more detail, part of the computer system of FIG. 2.

FIG. 3 illustrates part of the system of FIG. 2 in more detail. In particular, FIG. 3 illustrates the top right of the system in FIG. 2, to the right of the bus 15. It will be noted that a serial connection from the bus 15 is connected to the FPGA 16. The FPGA 16 includes a bus controller 58, which acts as a bus master for the low pin count (LPC) bus 19 to which the trust module 20 is connected. Also connected to the FPGA is an Xbus 21 to which the real-time clock 22 and the flash ROM 24 are connected. Also connected to the FPGA 16 is a clock generator 60. Various connections are provided between the FPGA 16 and the system controller 18 via the bus structure 17. This includes a console interface, an operating system heartbeat (O/S_HB) connection, a JTAG connection and a host interface connection. Connected to the host interface connection is a bus structure 25 to which the DRAM 26 and the flash ROM 28 are connected. The bus structure 29 provides connections between the system controller 18 and an interface 68 for a serial management connection 72. Also provided by the bus connection 29 is a physical interface 70 to a network interface 74. The serial management connection 72 and the network management connection 74 together form the console and network port 30 illustrated in FIG. 2.

FIG. 3 also illustrates a number of components connected to an I2C bus 75. These include an EEPROM 76 and a chip 78, which contains a field replaceable unit identity (FRUID) for the system controller 18. Also connected to the I2C bus are temperature sensors and environmental sensors 80 and 82. A multiplexer 84 is also connected to the I2C bus 75. The multiplexer 84 in turn provides connections to first and second power supply units 86 and 88, and to a system configuration card (SCC) receiver 90 for receiving a system configuration card which forms a removable storage device for storing system configuration data. Also connected to the multiplexer 84 are serial presence detect ports (SPDs) 96 and 98 for the memory 14. The network interface cards 40 and 42 shown in FIG. 2 are also connected to the multiplexer 84.

As mentioned above, the system controller 18 is operable to support management functions within the computer system 10. In particular, the service controller is able to interface with the system components, for example via the I2C bus 75.

Remote management may be performed using, for example a management server 100 as illustrated schematically in FIG. 1. The management server 100 can, for example, provide aggregate management and monitoring for a large number of computer systems 10.

The management server 100 may be operable to perform hardware fault failover in response to hardware failures detected by the management server 100 or reported to it by the service controller 18 of a computer system 10 or another entity. In addition, the management server 100 may be operable to perform software deployment to individual computer systems 10.

Although a single type of computer system 10 is illustrated in FIG. 2, a number of different computer systems having different hardware and/or software configurations and implementations may be managed by a single management server 100. A platform is to be understood to be a system with a single point of presence for management of the hardware. This may for example, be a single computer such as the computer system 10, or it may be a shelf containing multiple servers or another grouping of servers. A single platform may thus have one or more associated domains, wherein a domain forms an instance of an operating system (e.g., a Solaris® operating system) supporting applications/services based on the operating system software interfaces.

Figure 4:
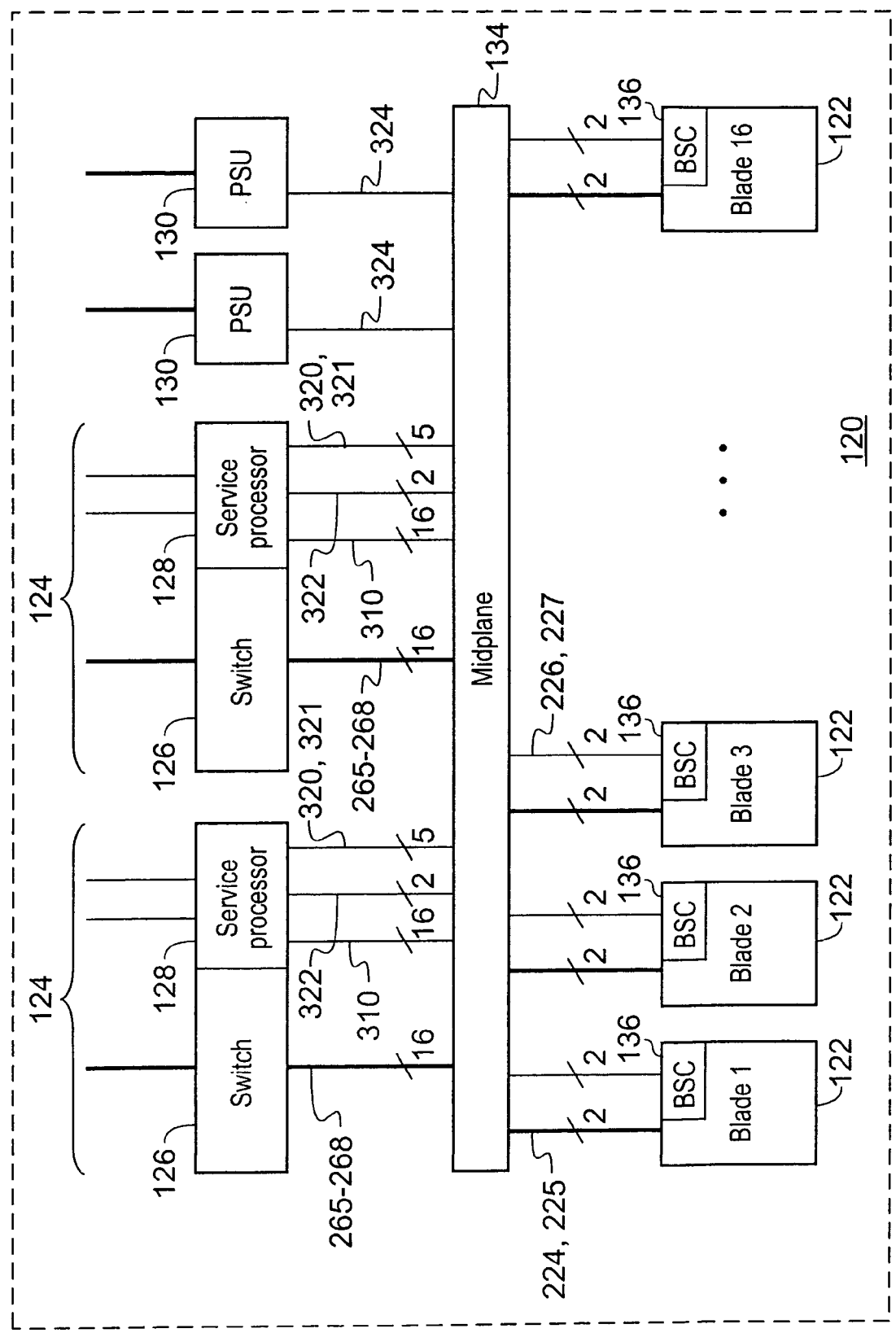
FIG. 4 is a functional block diagram showing the connectivity between the components of a rack-mountable shelf.

For example, FIG. 4 is a schematic presentation of components of a blade server system that comprises a blade server shelf 120 for mounting in a rack system. The shelf 120 comprises an enclosure and forms a carrier configured to carry a plurality of information processing cartridges, termed hereinafter termed server blades, 122 located side by side along the shelf. The term "shelf" is used herein in a conventional way to describe a structure that is mountable in rack system and is configured to carry one or more components to form at least a part of a rack-mountable system.

In the present example, each server blade 122 is configured as a field replaceable unit (FRU). Each server blade 122 includes a blade service controller (BSC) 136. In the present example of a shelf, up to sixteen server blades 122 can be installed in respective openings in a front face of the shelf 120. The number of server blades 120 actually installed in any installation is dependent upon the system configuration required. Two Combined Switch and Service Processors (CSSPs) 124 and two Power Supply Units (PSUs) 130 can be provided, also configured as FRUs. The duplication is to provide redundancy in operation. As shown in FIG. 4, each CSSP 124 includes a switch portion 126 and a shelf service processor (SSP) portion 128. A midplane 134 is provided in the shelf 120 to interconnect the server blades 122 to the other FRUs mounted in the rear of the shelf.

The FRUs (e.g., the server blades, 43, the CSSPs 71 and the PSUs 81) can all be configured as sealed units that do not contain any internal FRUs themselves and do not contain user serviceable items. The enclosures of the FRUs can be arranged to enclose all of the functional components of the FRU with only electrical connectors being externally accessible and with indicator LEDs being externally visible as well.

These factors can all contribute to keeping the cost of the FRUs low, as well as that of the overall system. The modular approach with the use of sealed modular field replaceable units for providing system functionality and with non-field replaceable units designed with a minimum possible number of active components enhances reliability. Moreover, easy and rapid maintenance is facilitated in the event of a failure of a FRU by simple replacement of that FRU, further reducing the cost of ownership. Further, the provision of a rack mountable shelf, that includes power supplies, an SSP and switches in modular units, for carrying a number of server blades, wherein the number of server blades can be chosen according to customer requirements, provides a flexible and scalable computer configuration. The balancing of the load between the processors of the server blades can be effected by software using conventional principles.

FIG. 4 also represents an example of data connectivity between the FRUs and midplane of the shelf 120. Power transmission paths are not illustrated in FIG. 4. However, to facilitate the maximum component redundancy of the shelf 120, each PSU 130 can independently provide power to each FRU.

In the present example each of the blades servers 122 connects to the midplane 134 via a pair of information signal connections (e.g., Gb Ethernet) 224, 225 and a pair of serial management signal connections 226, 227. Connections within the midplane 134 can ensure that each information signal link 224 is directed to a connection 265-268 from the midplane 134 to a first switch 126, and that each information signal link 225 is directed to a connection 265-268 from the midplane 134 to a second switch 126. Thus one information signal link can be established between each server blade 122 and the switch 126 of each CSSP 124. Further connections within the midplane 134 can ensure that each serial connection 226 is directed to a connection 310 from the midplane 134 to the first SSP 128 and that each serial connection 227 is directed to the second SSP 128. Thus one serial link can be established between each processing cartridge 122 and the SSP 128 of each CSSP 124. Information signal connections other than Gb Ethernet connections (e.g., Infinband connections) could be employed in other examples.

A plurality of serial connections can interconnect each SSP 128. Serial lines 320, 321 can connect each SSP 128 to the midplane 134 and connections within the midplane can connect the two sets of lines together. To provide a control interface from the SSPs 128 to the PSUs 130, serial lines 322 can connect each SSP to the midplane 134 and connections within the midplane 134 can connect to serial lines 324 from the midplane 134 to each PSU 130.

Figure 5:
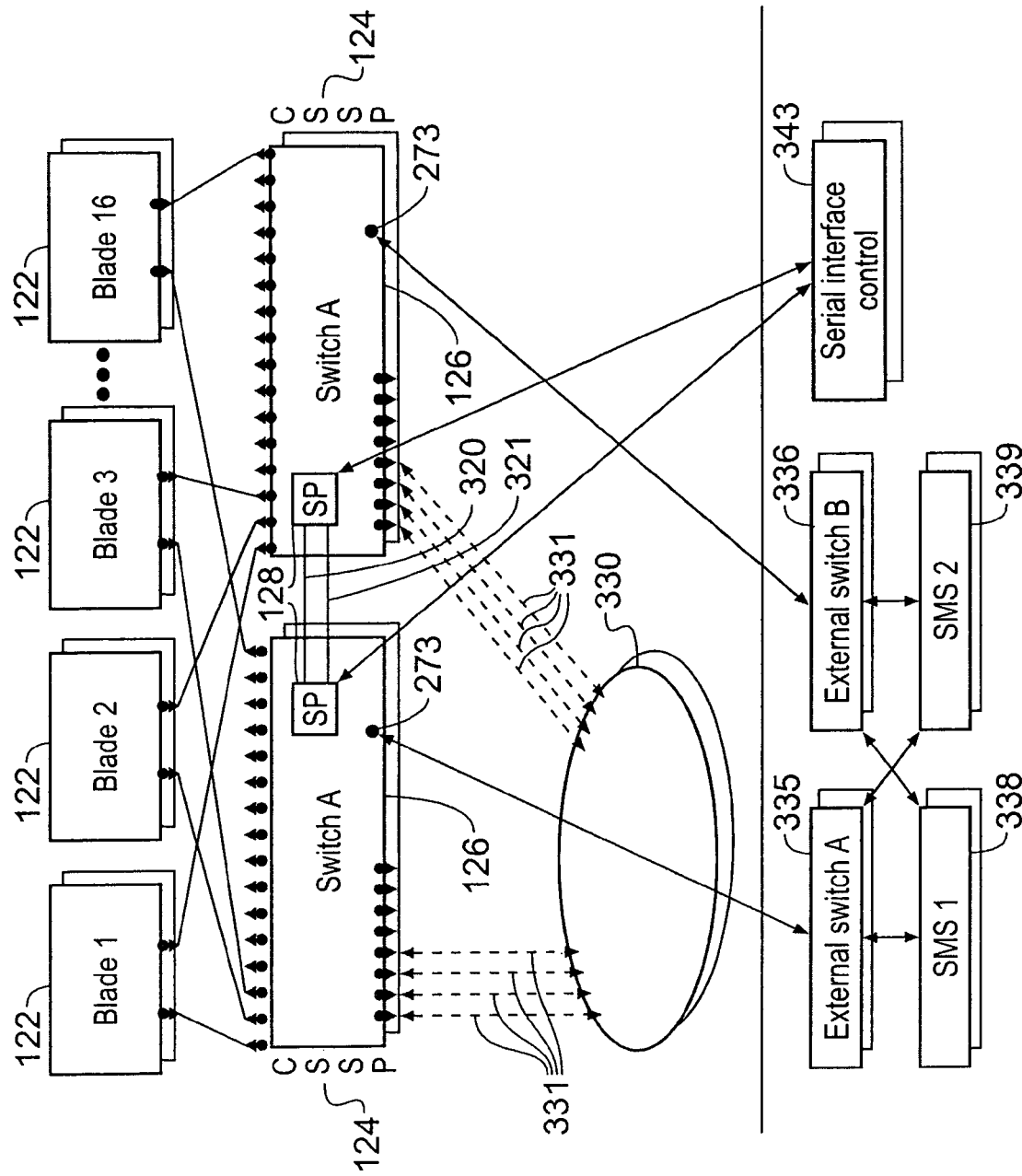
FIG. 5 is a functional block diagram showing the external connectivity of the shelf of FIG. 4.

An example of data and control connectivity of the shelf 120 to and from computer systems external to the shelf 120 when the shelf 120 is arranged for use within a multiprocessor server system will be described with reference to FIG. 5.

To provide external data connectivity between the shelf 120 and an external core data network 330, in association with which all information processing performed by the processing cartridges 122 of the shelf 120 is undertaken, connections 331 can be formed between the core data network 330 and information signal ports provided on a rear panel of the CSSP 124.

In the present example, control and configuration of the shelf 120 are separate to the connections to the core data network 330. A first external switch 335 can connect to a management (I2C) port 273 of the first CSSP 124 and a second external switch 336 can connect to a management (I2C) port 273 of the second CSSP 124. The management port 273 can provide a management network interface to both the switch 126 and the SSP 128 of each CSSP 124. The external switches 335, 336 can each be connected to each of a pair of System Management Server (SMSs) 338, 339. In a typical multiprocessor server system a plurality of shelves 120 may be connected together via the core data network 330 under the control of a single management network utilizing one set of SMSs 338, 339. A set of SMSs 338, 339 may comprise a single SMS (as well as a plurality thereof). However use of at least two SMSs enables redundancy of components, therefore increasing overall system reliability.

A serial interface control 343 operable under telnet protocol control is also connected to the shelf 120 in the present example. This can provide a common operating system/boot console connection to the SSP 128 of both CSSPs 124.

Figure 6:
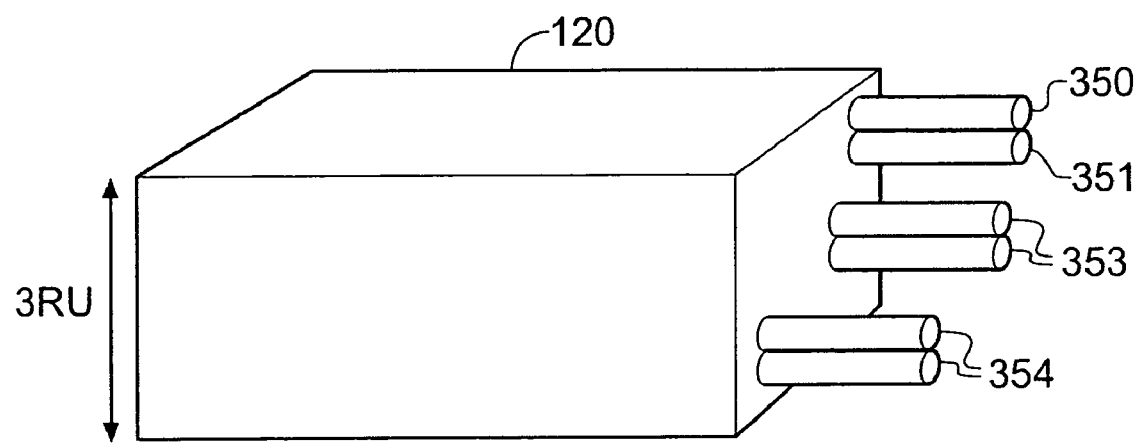
FIG. 6 is a schematic representation of a shelf showing the external connections from the shelf of FIG. 4.

As illustrated in FIG. 6, an example of the external connections from a shelf 120 can be in the form of two active information signal connections (e.g., Ethernet connections) 350 and 351, two active power connections 353 and an active/standby pair of management connections 354. With regard to the management connections, each connection comprises a serial connection and a network (e.g., Ethernet or Infiniband) connection. It is possible to connect to either the active or the standby connection, as the incoming signal will be internally routed to whichever management controller (CSSP) is the current master. It will be appreciated, therefore, that the connections to a shelf can be kept to a minimum. It will further be appreciated from the configuration shown in FIG. 6 that the system is scalable beyond a single shelf unit 120.

Figure 7:
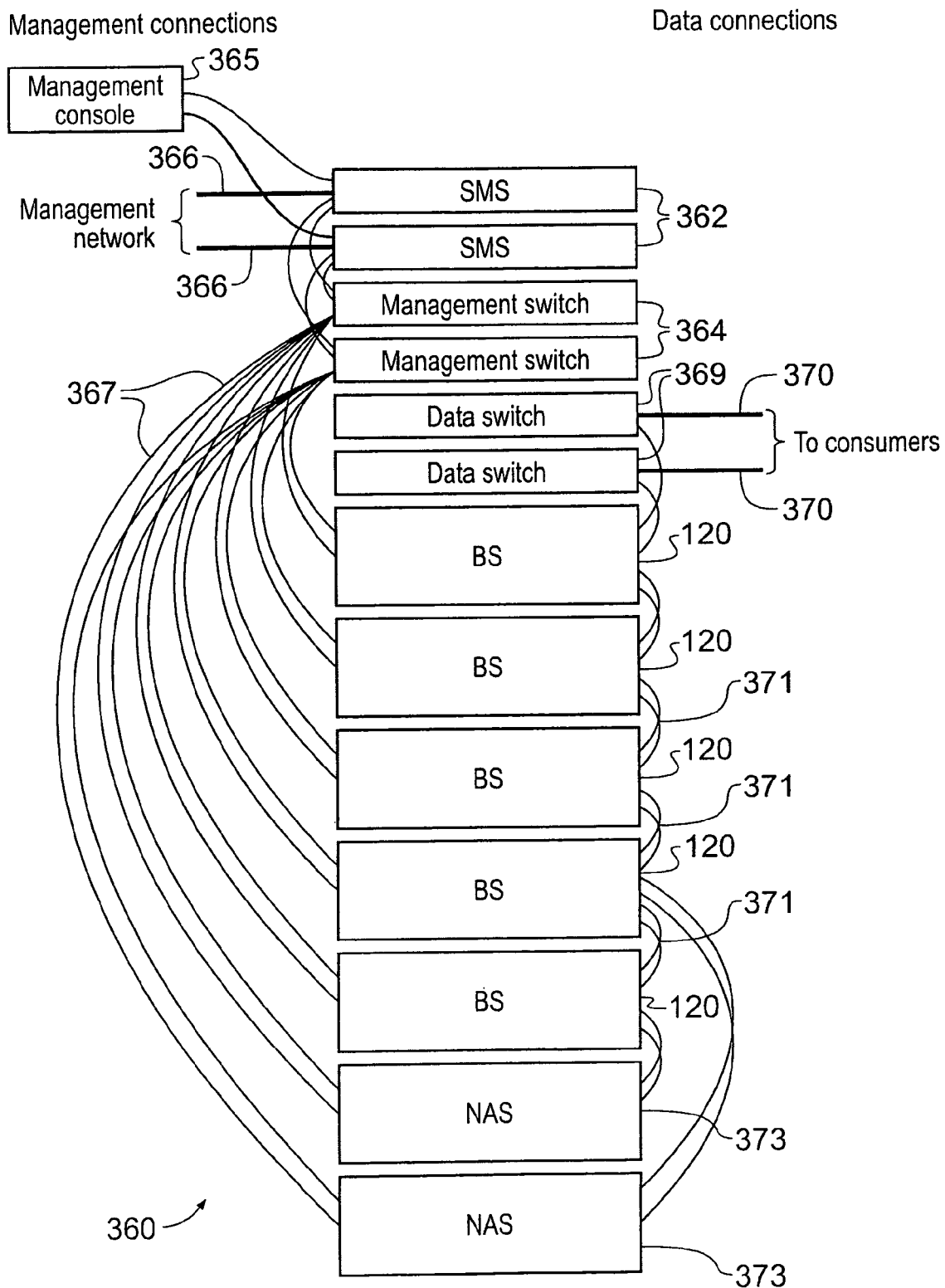
FIG. 7 is a schematic representation of a rack mounted system comprising a plurality of such shelves.

FIG. 7 illustrates how a plurality of shelves can be configured within one or more racks to provide even higher processing power. Such a constellation of shelves to provide a large grouping of servers is sometimes termed a "web farm" or "server farm" 360. As shown in FIG. 6, the server farm comprises a plurality of shelves 120 that each carry a plurality of blades 43. Also provided are a plurality of Network Attached Storage devices (NAS) 373 for providing storage for critical data, e.g., email data storage, for the server farm. The NASs 373 are not required if there is no critical data to be stored, e.g., if the server farm is operating solely to provide web caching services.

Management control of the server farm 360 can be provided through a pair of System Management Servers (SMSs) 362. Each SMS 362 can be connected to a management network via a link 366 and to a management console 365. The management console can be configured by programming a conventional personal computer or workstation, comprising a processor, memory, storage, user input/output devices, a display, network adapters, etc. The SMSs 362 can communicate with the individual shelves 120 via a pair of management switches 364. Each shelf 120 and NAS 373 can be connected to each management switch 364 via a connection 367. Thus dual redundant management connections can be provided to each shelf 120 and NAS 373.

Flow of data to and from the server farm 360 can be provided through a pair of data switches 369. Each data switch 369 can be connected to a consumer network via a link 370. It is to be understood that the consumer network can be a larger data network to which the server farm 360 is connected. This network can be an office or corporation intranet, a local area network (LAN), a wide area network (WAN), the Internet or any other network. Connections between the data switches and the shelves 120 can be facilitated by connections 371. It is to be noted that as each shelf has its own switching capability, there is no need for each shelf 120 to be directly connected to the data switches 369. Connections can also be provided to connect the NAS units 373 to the shelves 120. The topology used for interconnection of the data switches 369, shelves 120 and NASs 373 can be any topology providing at least one connection of any length between every possible pair of units. Complex topologies arranged to minimize the maximum connection length between any two given units in the server farm can be used.

The server farm 360 comprising a plurality of shelves 120 with or without a plurality of NASs 373 can suitably be used as any or all of an entry edge server group, web edge server group and application servers of a server farm.

As an alternative to providing critical data storage within a NAS 373, such storage can be provided within one or more NAS cartridges fitted into one or more of the shelves 120 in place of processing cartridges 43. Another alternative is to provide a server shelf with local storage such as a RAID array (Redundant Array of Inexpensive Disks) in place of the NAS 373.

In a system as described above the server blades 122 can use different hardware. For example, whereas some server blades may be based on an UltraSPARC™ processor, other possible processors include, but are not limited to, Intel x86 series and compatible processors, AMD x86 compatible processors, Alpha processors and PowerPC processors. Indeed the server blades may include one or more processors. Also, each module within a shelf or farm may run under the same operating system, or a plurality of different operating systems may be used. Examples of possible operating systems include Sun Microsystems' Solaris® OS or another UNIX™-Type OS such as Linux™, MINIX™, or Irix™, or UNIX™ or a Microsoft OS such as Windows NT™, Windows 2000™, Windows ME/98/95™, Windows XP™. It is also not necessary that each server blade within a shelf or farm be configured to run the same program software. For example, individual processing cartridges may be configured to execute, for example, fileserver software, mailserver software, web-hosting software, database software, firewall software, or verification software.

The server farm includes a hierarchy of management components. The blade service controller (BSC) 136 of each server blade 122 provides a local controller of service functions for that server blade 122. Each BSC 136 is arranged to be able to communicate with the SSP 128 of each CSSP 124 via the connections 226, 227 and 310 (see FIG. 4). The SSP 128 provides shelf-level service functions for the population of each shelf 120, which includes the PSUs 130 and the switches 126 of the CSSPs 124 as well as the processing cartridges 122. Each SSP 128 is arranged to be operable to communicate with an external system management server (SMS) 338, 339 via I/O connector 273 as illustrated in FIG. 5. The SMSs 338, 339 provide system level service functions for one or more shelves 120. The SMSs may also provide service functions to computer system modules other than shelves 120 within a computer system, for example to individual server units and/or to reliable storage units such as Network Addressable Storage (NAS) units. The operation of the SMSs 338, 339 may be controlled via a management network 366, such that control may be automated (via a higher level of system management) or manual (via a terminal to the management network 366) or a mixture of both. The SMSs 388, 399 may also be directly connected to a management terminal 365 for direct operator control of the particular system management server.

An embodiment of the invention seeks to provide platform abstraction, from which is to be understood that computing services may be configured and managed without knowledge of the underlying hardware providing these services.

In the present example of a network-connected system as described above, a mechanism is provided effective remote management of the components of the network-connected system. In particular, a mechanism is provided for the generation of an object model for managing a computer system. In this context, the generation of the object model is to be understood to include not only the initial creation of the object model, but also the maintenance of the object model.

An example of the invention provides an apparatus and method for generating an object model for providing effective remote management of the components of such a network connected system or device as that described above. It further provides an architecture that enables the incorporation in an effective manner of new platforms to be managed. Examples of the invention can provide a mechanism whereby management interface(s) can be supported through a flexible distribution of the management system architecture regardless of the capabilities of the computer system being monitored.

Figure 8:
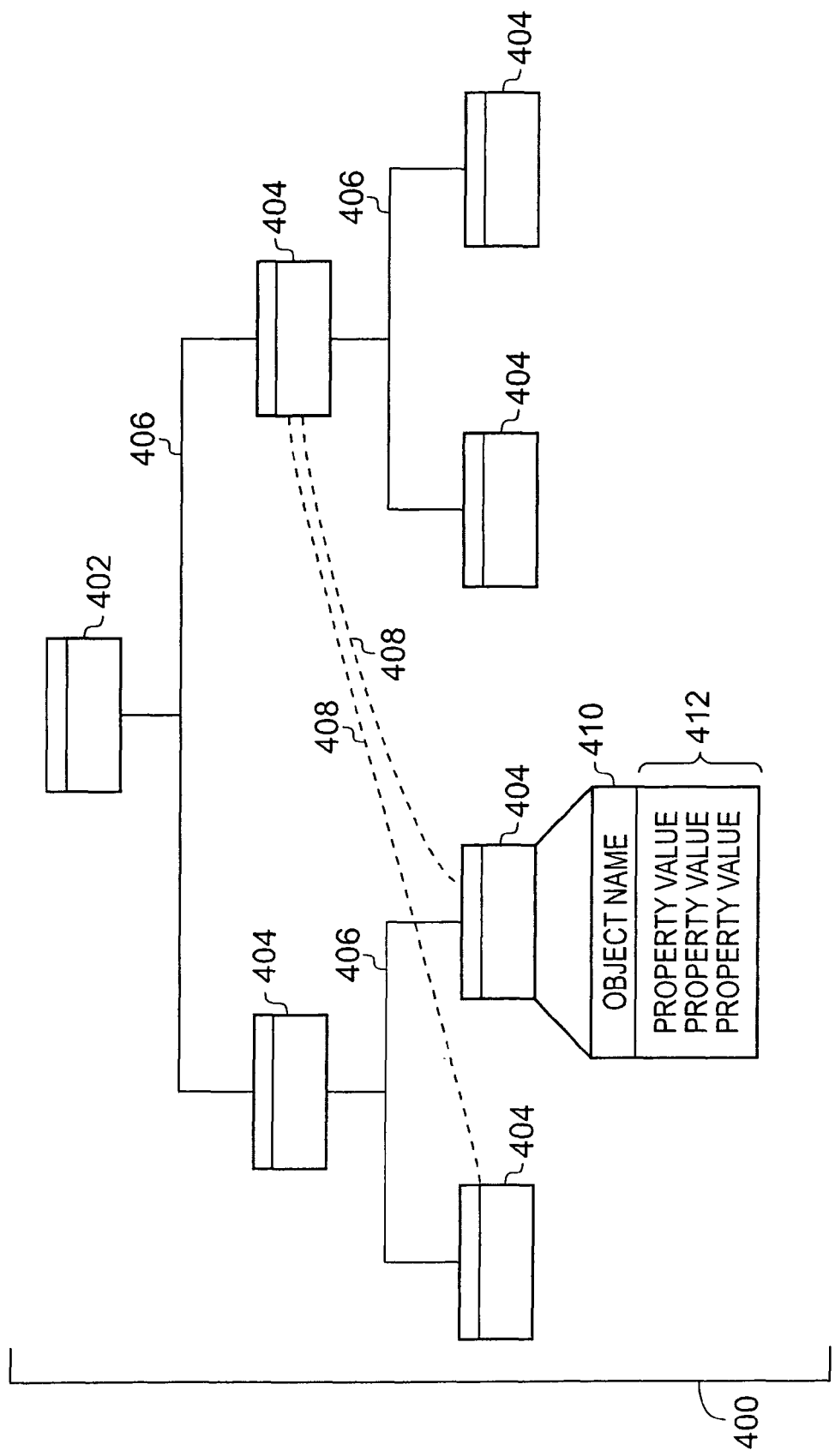
FIG. 8 is a schematic representation of an object model for system management.

FIG. 8 is a schematic representation of an object model 400 for use in management of a computer system. The object model comprises a structured hierarchy of objects 404 including a root object 402.

The object model is created and maintained using assemblies. An assembly is a component of the object model. It may be a single property, a single object, or it may be a set of objects and their associations, and it may contain other assemblies. An assembly is used to describe a part of the object model that is constructed as a single unit. Accordingly, the object model is constructed from an assembly of associated assemblies.

The fundamental quanta of management information are the property values 412 that can be incorporated in objects 404 identified by object names 410. The property values represent the level of information supported by the object model architecture from the most basic of managed systems. Such properties might include static information, such as inventory, and dynamic or variable information such as temperature readings and system state. Instrumentation at the property level can be addressed by data acquisition modules (component/instrumentation modules) that communicate with underlying platform interfaces.

Object-oriented management information can be exposed, whereby the characteristics of specific system resources are represented by collections of properties which may be manipulated as a single entity. Such objects might include representations of field replaceable units, capacities, processors, memory, etc. Instrumentation at the object level can be addressed by software components that aggregate these properties to create higher-level management information.

The resources are not only represented as a set of managed objects 404, but also by associations 406, 408 between them. Such associations are used to represent, for example, the location of field replaceable units (FRUs) in their receptacles. The associations can include so-called containment associations 406 and secondary associations 408. At this level of complexity, the representation is considered to be a complete object model.

In order to present such an object model to management applications, that object model is exported via a management interface. Such management interfaces include, for example, the Simple Network Management Protocol (SNMP), Web-Based Enterprise Management (WBEM), and Java Management Extensions (JMX).

In an example of the present invention, a management adapter is able to provide a standardized representation of various platform types in a generic manner that can support different management interfaces.

Figure 9:
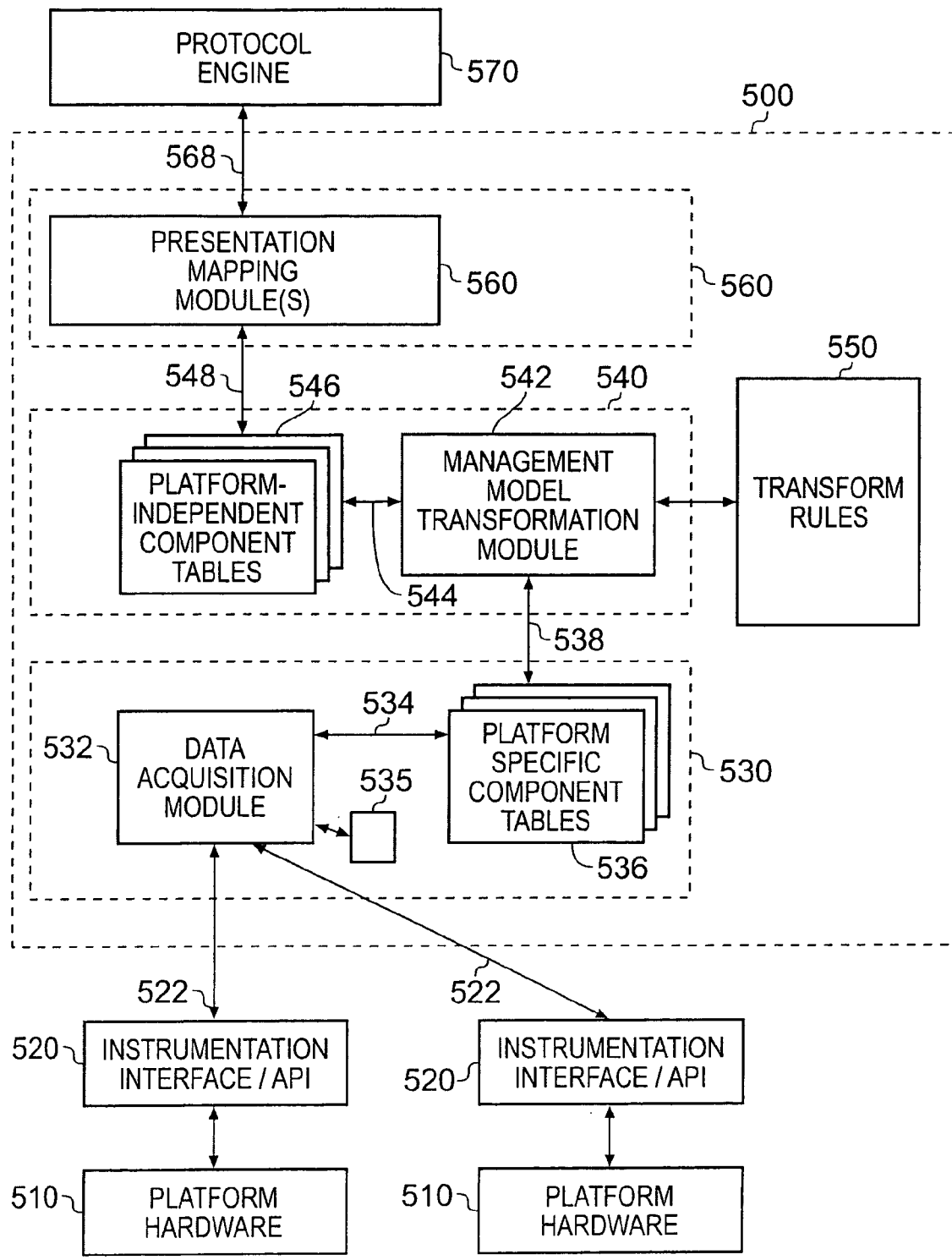
FIG. 9 is a schematic representation of a management adapter for an embodiment of the present invention.

FIG. 9 is a schematic block diagram of an example embodiment of a management adapter 500 in accordance with the present invention. The management adapter can be implemented in the service controller 18 of the computer system of FIG. 2 or 3, or could be implemented in the SSPs 128 of a shelf 120 of a computer system as described with reference to FIGS. 4-7. The management adapter could, however, be implemented at another level within the system described with reference to FIGS. 4-7. For example, the system of FIGS. 2 and 3 could form part of the system of FIGS. 4-7. Also, the functionality of the management adapter could be distributed at different levels within the management hierarchy of FIGS. 4-7.

The management adapter 500 illustrated in FIG. 9 includes a data acquisition layer 530, a management model transformation layer 540 and a presentation mapping layer 560.

The data acquisition layer 530 is operable to provide a mapping between one or more platform-specific instrumentation interfaces 520 for managed platform components 510 and one or more platform-specific component tables 536, supported by the data acquisition layer, for providing a platform-specific representation of the platform components.

The management model transformation layer 540 is operable to provide a mapping between the platform-specific component table(s) 536 exported by the data acquisition layer and one or more generic component tables 546 providing a platform-independent representation of the platform components.

The presentation mapping layer is operable to provide a mapping between the generic component table(s) 546 and a management protocol schema supported by a protocol engine 570.

The data acquisition layer will now be described in more detail. To address the variations in possible instrumentation interfaces/APIs/protocols that may be available on different platforms, the data acquisition layer 530 provides an interface between the management agent and the mechanisms that are available on a supported platform. While the data acquisition 530 has specific knowledge of the underlying interfaces and the nature of the data that is available through those interfaces, it is only responsible for extracting the data into a tabular form on which high level layers can operate.

In particular, the data acquisition layer includes one or more data acquisition modules 532 that are able to interface with the instrumentation interfaces 520 as represented at 522 and maintain one or more platform-specific component tables 536 as represented at 534. The tabular form presented by the data acquisition layer 530 breaks the representation of the managed environment into a set of one or more tables 536 that can be readily be traversed by higher layers to establish a mapping to a published management model (for example a MIB). In the present example, the platform-specific component tables 536 published at 538 by the data acquisition layer 530 comprise a table 536 for each class of component/device. Examples of such components/devices include fans, numeric sensors, binary sensors, CPUs and memory.

Figure 10:
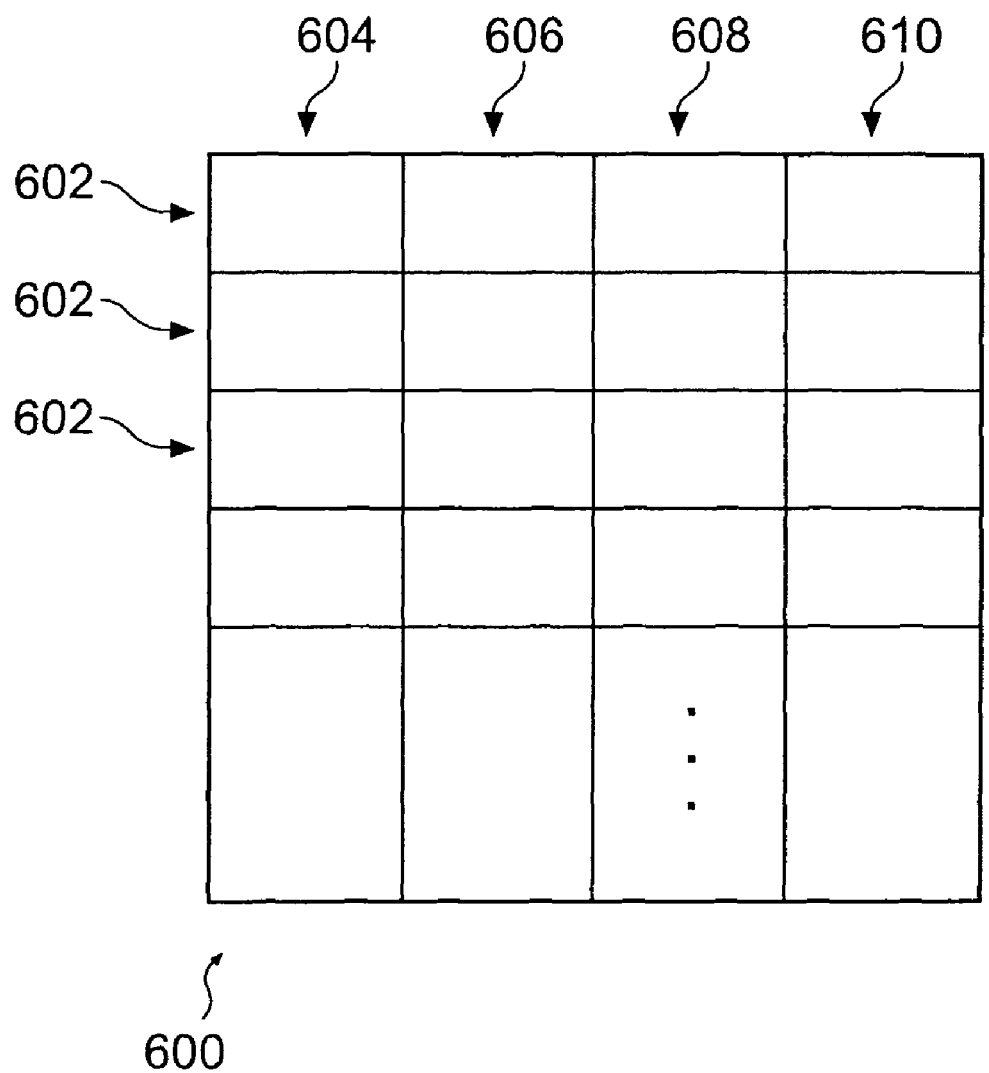
FIG. 10 is a schematic representation of an example of a table of an embodiment of the invention.

FIG. 10 provides a schematic representation of a table 600 such as a component table. It will be noted that the table includes rows and columns. Each row 602 in the table can represent an instance of a class of component represented by the table, with different columns, or fields representing different information such as a name 604, a description 606, an operating parameter 608 and a current value 610 for the parameter.

Where possible the data acquisition modules 530 uses generic knowledge of the platform(s) held by the data acquisition modules 532 to ensure that data is placed into appropriate table entries. For example, the data acquisition modules 532 may be programmed to have knowledge that particular values provided by an underlying instrumentation interface 520 relate to numeric sensors, in which case the data should be placed into a numeric sensor table 536 published by the data acquisition layer 530 to higher layers. An exact or precise placement of the data into a particular table location is not required as the tables can be transformed. This means that the same data acquisition layer 530 (without additional code changes) can function over a large set of platforms or components provided that the underlying instrumentation interface/API is supported.

In one example, a single data acquisition layer 530 is employed that operates against an Object API at the heart of the service controller 18 of the system of FIGS. 2 and 3, or in the SSPs 128 of the system of FIGS. 4-7. The data acquisition layer 530 can be operable on all platforms employing the service controller 18 or the SSPs 128, without platform-specific changes, even where there are variations between those platforms.

The data acquisition modules 532 of the data acquisition layer 530 maintain a mapping mechanism between the data that the data acquisition layer 530 publishes at 538 and the underlying representation from which the data is extracted, such that future requests from higher layers to update or set values can be appropriately honored. To this end, the data acquisition layer 530 also publishes a set of keys to the higher layers that can be used for future identification. The mapping may vary from one API/protocol to another and the mapping can be considered as a "black box" and not be published by the data acquisition layer 530. The data acquisition layer 530 can maintain a form of cache 535 that is used to map the identities of its published managed objects to the underlying instances. Keys used by the data acquisition layer 530 are capable of handling transitions in the management model that result in objects both being removed and added to the model, such that a key always identifies a known, specific component and that over time the identity of that same component will not change regardless of changes elsewhere.

The data acquisition layer 530 publishes data through a 'Management Model Transformation Layer' (MMTL) 540. This layer ensures that what is published 548 in generic component tables 546 to the Presentation Mapping Layer 560 is consistent for the specific platform on which the agent is running. The management model transformation layer relies on a per platform rule set 550, which describes the transformations that are required for the specific platform that the agent is running on. The mapping is performed by one or more management model transformation modules 542 in a completely data driven, dynamic fashion and does not rely on code modules or other static functionality. Thus the management model transformation modules 542 are able to provide a mapping between the platform specific component tables 536 and the platform independent component tables as represented at 546. The ability to describe transformations in data means that should changes be needed or other updates requires to eventual published model (i.e. through the management information base (MIB)) at some future date, these can be made in the field without changes to the software.

The rules that define the transformation mapping are able to identify which rows in the tables 536 published by the data acquisition layer 530 are to be modified. While any value in a row could potentially be used, if there are commonly used identifiers for rows then these make a good choice for rule identification.

To minimize the number of rules that are provided, the transformation rules 550 can provide a regular expression mechanism such that a single rule can identify multiple table entries that may require updates. It should also be noted that the way in which the expression is found to match, may determine how values in that row change, since portions of the matching text may need to be placed into the updated values. To identify parts of the regular expression that can be used in this way, parenthesis are used. Such enclosed regions are subsequently passed into patterns in the output string template. These patterns can then be expanded using the substrings matching the enclosed regions.

Template pattern strings are then used to define the output strings. These reference previously matched substrings using backslashes and a numeric identifier that specifies which parenthesized expression is to be placed into the output string. Such backslashes can be escaped using the C escape sequence.

For example, the extended regular expression "^ CH/MB/C0/P([0-9]+)/(F[0-9]+)$" (which has two parenthesized strings "([0-9]+" and "F[0-9]+") would match "CH/MB/C0/P1/F0".

Thus the template string
"Processor \\1 Fan \\2 Tachometer"
could be expanded to
"Processor 1 Fan F0 Tachometer".

Implementations may also provide additional global strings that are identified in the template string by using '$' as a string insertion marker. Such strings may relate to the global identity of the chassis on which the agent is running, or the name of the platform/FRU (Field Replaceable Unit). Such strings are not directly derived from any single row in a particular table but may be required in generating the output strings.

As an optimization, particularly in embedded environments such as service processors, the transformation rules can define strings that are likely to occur frequently. These are then be added to a dictionary that provides a single reference for that string throughout an agent implementation. This has a further advantage of enabling string comparisons to be made directly through pointer comparisons rather than comparing each character within the string, reducing the number of CPU cycles required to run the agent. A string is added to the dictionary through a declaration:

StringTracker STRING

STRING is the string to add, enclosed in double quotes.

The rest of the rules are composed of a sequence of commands. Commands are terminated by a semicolon ';'.

Most commands in the rules specify a template, which details the values to be applied for individual table columns. A template consists of a series of name/value assignments enclosed by braces { }. A name/value assignment is represented as follows

NAME=VALUE

NAME is one of the column name identifiers for the tables published by the data acquisition layer 530.

VALUE consists of a string, a named value or a decimal number, or a bitmask expression depending upon the type of the attribute.

It is not necessary to specify all possible attributes for a row in a given table, only those for which default values do not apply. In the case of the MODIFY command, unspecified attributes are left unchanged.

The ADD command has the following syntax:
ADD TABLE_IDENTIFIER STRING TEMPLATE
TABLE_IDENTIFIER is a valid table identifier that identifies the table to which the table entry is to be added. It should be noted that this command therefore enables tables 546 to be created, even when the underlying data acquisition layer 530 has been unable to publish into the tables 536.

STRING is a string that defines an extended regular expression that is applied across all tables. A match causes the corresponding row to be created. Each command may match one or more times, enabling complete tables to be built on the basis of the presence of entries in other tables. A NULL string specifies that the row will always be added to the common model.

TEMPLATE is a template definition that defines the contents of the common model row to be created.

The following example adds a new entry for every existing table entry that matches "foo:Si:/bar/Cj/Pk". The new entries are identified by "Midplane/Si/Blade/bar/Cj".

```
ADD Location_Table "^[^:]*:(S[0-9]+):/(.*/C[0-9]+)/P[0-9]+$"{
    Key             = "\\1:\\2"
    Description     = "$FRU_ID Blade CPU Module Slot"
    Manufacturer    = "Sun Microsystems, Inc."
    AcceptableTypes = "ZIF socket for 370 pin PGA"
    PhysicalClass   = Container
    HolderType      = Slot
    NacName         = "Midplane/\\1/Blade\\2"
};
```

The REMOVE command has the following syntax:
REMOVE TABLE_IDENTIFIER STRING
TABLE_IDENTIFIER identifies the table 536 published by the data acquisition layer 530 that is to be removed by the command.

STRING is an extended regular expression that will be used to match the entries that are to be removed.

The following example removes all entries from the platform specific component table 536 that match "foo:Sn".
REMOVE Component_Table "^[^:]*:S[0-9]+$"
The MODIFY command has the following syntax:
MODIFY TABLE_IDENTIFIER STRING TEMPLATE TABLE_IDENTIFIER identifies the table 536 published by the data acquisition layer 530 that is to be updated by the command.

STRING is an extended regular expression matching the row(s) to be modified. If more than one MODIFY rule matches a given Common Model row, the first entry in the list of rules will be the one that is used.

TEMPLATE is a template specifying the table columns and the corresponding values to be substituted.

The following example modifies all entries with keys in the form "foo:PSn/PS" such that their name reads "Midplane/PSn/PS". The Description will read "Sun Fire B1600 Power Supply FRU Enclosure".

```
MODIFY Component_Table "^[ :]*:(PS[0-9]+)/PS:$"{
    Description     = "$CHASSIS_ID Power Supply FRU Enclosure"
    NacName         = "Midplane/\\ 1/PS"
};
```

After the application of any applicable rules, the management model transformation layer 540 ensures a consistent model by creating entries in table 546 for components that are required to ensure a fully connected hierarchical object representation of the managed system. The creation of such entries can be determined through the use of any hierarchical naming mechanisms that may be provided by the data acquisition layer 530.

A DEFAULT command specifies a default template to be used when constructing these artificial rows instead of a built-in default.

The syntax of the DEFAULT command is as follows:
DEFAULT TABLE_IDENTIFIER TEMPLATE
TABLE_IDENTIFIER specifies a table 536 for which the template is to be the default.

TEMPLATE specifies the default values for the specified table entry. String values in the template may use the "\\0" pattern back reference to substitute the rows name (this is constructed by taking the name of the orphaned object and determining a potential parent identity by removal of the top most named element).

The following example command sets default values for all entries in a Fan Table 536 constructed by default in order to contain orphaned objects. The Location of the Fan entries is set to the name and the Description to "<Name> Fan". Default values for OperationalStatus, Hotswappable and Removable are also specified.

```
DEFAULT Fan_Table {
    Location          = "\\0"
    Description       = "\\0 Fan"
    OperationalStatus = DASHDASH
    Hotswappable      = False
    Removable         = False
};
```

A Presentation Mapping Layer (PML) 560 is responsible for taking the uniform (and now consistent across platforms and implementations) representation provided by the management model transformation layer 540 and providing a presentation of that information that is appropriate to the supported management protocols. The presentation mapping layer 560 is entirely platform independent and is responsible for a number of items.

For example, the presentation mapping layer 560 can be responsible for supporting a set of management schema (for example MIBs) that are the published interface that is consumed by the user (i.e. administrator) of the management agent.

The presentation mapping layer 560 can also be responsible for applying any common policies, for example, for determining that sensors are above a particular threshold and that an event (a trap for SNMP) should be provided to the management agent.

The presentation mapping layer 560 can also be responsible for taking requests to modify information in the management model that are made by the external management application and passing those requests to the management model transformation layer 540.

The presentation mapping layer 560 interfaces with the top level protocol mechanism 570 to export data in the prescribed schema and to accept inbound requests to change/set values within the management model. For example, in the case of an SNMP agent, the protocol is handled by a 'SNMP Command Responder' that provides a set of APIs that the presentation mapping layer 560 can use to populate the published MIBs.

Thus there has been described a management adapter for a computer management system. A data acquisition layer provides a mapping between platform-specific instrumentation interface and platform-specific component tables. A management model transformation layer provides a mapping between the platform-specific component tables and generic component tables. A presentation mapping layer provides a mapping between the generic component tables and a management protocol schema.

The distribution of the modules that form the management adapter is flexible in that the interfaces between them may be local or remote. The flexibility of this architecture enables it to be used as a generic management system, for example configured as an agent, which can be used to instrument a wide variety of computer resources, for example from those that may host the entire agent architecture to those which use a proxy because they are only able to provide data properties.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer readable storage medium comprising program instructions, wherein the program instructions are executable to implement: —at least one data acquisition module operable to provide a mapping between at least one platform-specific instrumentation interface for a computer system platform and at least one platform-specific component table providing a platform-specific representation of platform components; —at least one management model transformation module operable to provide a mapping between the at least one platform-specific component table and at least one generic component table providing a platform-independent representation of the platform components; and—at least one presentation mapping module operable to provide a mapping between the at least one generic component table and a management protocol schema.

2. The non-transitory computer readable storage medium of claim 1, comprising a platform-specific component table for each class of platform component.

3. The non-transitory computer readable storage medium of claim 1, wherein respective entries in the at least one platform-specific table relates to respective instances of a platform component.

4. The non-transitory computer readable storage medium of claim 1, wherein the at least one data acquisition module is operable to maintain a mapping between instances of platform components and entries in the at least one platform-specific component table.

5. The non-transitory computer readable storage medium of claim 1, wherein the at least one management model transformation module is operable to respond to a mapping rule set for each platform for mapping between at least one platform-specific component table for the platform and the at least one generic component table.

6. The non-transitory computer readable storage medium of claim 1, wherein the at least one presentation mapping module is operable to export data in accordance with the management protocol schema.

7. The non-transitory computer readable storage medium of claim 1, wherein the at least one presentation mapping module is operable to accept management requests in accordance with the management protocol schema.

8. The non-transitory computer readable storage medium of claim 1, wherein the management protocol schema includes at least one management information base.

9. A computer system, comprising a service controller, the service controller providing a management adapter, the management adapter comprising:
   at least one data acquisition module operable to provide a mapping between at least one platform-specific instrumentation interface for a computer system platform and at least one platform-specific component table providing a platform-specific representation of platform components;
   at least one management model transformation module operable to provide a mapping between the at least one platform-specific component table and at least one generic component table providing a platform-independent representation of the platform components; and
   at least one presentation mapping module operable to provide a mapping between the at least one generic component table and a management protocol schema.

10. The computer system of claim 9, wherein the management adapter comprises a platform-specific component table for each class of platform component.

11. The computer system of claim 9, wherein respective entries in the at least one platform-specific table relates to respective instances of a platform component.

12. The computer system of claim 9, wherein the at least one data acquisition module is operable to maintain a mapping between instances of platform components and entries in the at least one platform-specific component table.

13. The computer system of claim 9, wherein the at least one management model transformation module is operable to respond to a mapping rule set for each platform for mapping between at least one platform-specific component table for the platform and the at least one generic component table.

14. The computer system of claim 9, wherein the at least one presentation mapping module is operable to export data in accordance with the management protocol schema.

15. The computer system of claim 9, wherein the at least one presentation mapping module is operable to accept management requests in accordance with the management protocol schema.

16. The computer system of claim 9, wherein the management protocol schema includes at least one management information base.

17. A method of managing a computer management system, the method comprising:
   (a) providing a mapping between at least one platform-specific instrumentation interface for a computer system platform and at least one platform-specific component table providing a platform-specific representation of platform components;
   (b) providing a mapping between the at least one platform-specific component table and at least one generic component table providing a platform-independent representation of the platform components; and
   (c) providing a mapping between the at least one generic component table and a management protocol schema.

18. The method of claim 17, comprising providing a platform-specific component table for each class of platform component.

19. The method of claim 17, wherein respective entries in the at least one platform-specific table relates to respective instances of a platform component.

20. The method of claim 17, wherein (a) comprises maintaining a mapping between instances of platform components and entries in the at least one platform-specific component table.

21. The method of claim 17, wherein (b) comprises responding to a mapping rule set for each platform for mapping between at least one platform-specific component table for the platform and the at least one generic component table.

22. The method of claim 17, wherein (c) comprises exporting data in accordance with the management protocol schema.

23. The method of claim 17, wherein (c) comprises accepting management requests in accordance with the management protocol schema.

24. The method of claim 17, wherein the management protocol schema includes at least one management information base.

25. A management adapter for a computer management system, the management adapter comprising:
   data acquisition means for mapping between platform-specific instrumentation interface means for a computer system platform and platform-specific component table means for a platform-specific representation of platform components;
   management model transformation means for mapping between the platform-specific component table means and generic component table means for a platform-independent representation of the platform components; and
   presentation mapping means for mapping between the generic component table means and management protocol schema means.

26. The computer readable storage medium of claim 1, wherein the program instructions implement a management adapter.

27. The computer readable storage medium of claim 1, wherein the program instructions implement a management agent.

* * * * *